(12) United States Patent
Luhn

(10) Patent No.: US 12,448,261 B2
(45) Date of Patent: Oct. 21, 2025

(54) FORK LIFT TOOL HOLDER APPARATUS

(71) Applicant: Jacob Luhn, Kenosha, WI (US)

(72) Inventor: Jacob Luhn, Kenosha, WI (US)

( * ) Notice: Subject to any disclaimer, the term of this patent is extended or adjusted under 35 U.S.C. 154(b) by 93 days.

(21) Appl. No.: 18/639,563

(22) Filed: Apr. 18, 2024

(65) Prior Publication Data
US 2024/0300789 A1 Sep. 12, 2024

(51) Int. Cl.
*B66F 9/075* (2006.01)
*B65H 35/00* (2006.01)

(52) U.S. Cl.
CPC ...... *B66F 9/07504* (2013.01); *B65H 35/0006* (2013.01)

(58) Field of Classification Search
CPC .. B60R 7/04; B60R 7/046; B60R 7/08; B60R 7/084; B60R 7/088; B60R 11/06; B60R 2011/0003; B60R 2011/0028; B60R 2011/0001; B60R 2011/005; B60R 2011/0052; B60R 2011/0059; A47K 10/38; A47K 10/16; A47K 10/18; A47K 10/22; B66F 9/07504
See application file for complete search history.

(56) References Cited

U.S. PATENT DOCUMENTS

| | | | |
|---|---|---|---|
| 3,213,815 A | 10/1965 | Russmann | |
| 7,077,238 B2 * | 7/2006 | Butler | E06C 7/14 248/210 |
| D620,260 S * | 7/2010 | Emmert | D3/313 |
| 8,103,418 B2 | 1/2012 | Osswald et al. | |
| 8,463,765 B2 | 6/2013 | Lesavich | |
| 9,037,564 B2 | 5/2015 | Lesavich et al. | |
| 9,137,250 B2 | 9/2015 | Lesavich et al. | |
| 9,361,479 B2 | 6/2016 | Lesavich et al. | |
| 9,569,771 B2 | 2/2017 | Lesavich et al. | |
| 9,907,231 B2 * | 3/2018 | Ponce | A01D 75/008 |
| 9,932,202 B2 | 4/2018 | Langeman | |
| 10,059,450 B2 | 8/2018 | Levron | |
| 10,392,131 B2 | 8/2019 | Deck et al. | |
| 10,433,682 B2 * | 10/2019 | McNicholas | A47K 10/22 |
| 10,457,518 B2 | 10/2019 | Zaun | |
| 10,474,122 B2 | 11/2019 | Nakahama | |
| 11,008,101 B2 | 5/2021 | Miller et al. | |
| 11,052,829 B2 * | 7/2021 | Brotherton | B60R 11/0235 |
| 11,103,038 B2 * | 8/2021 | Gooden | B60R 7/084 |
| 11,691,572 B2 | 7/2023 | Greeno | |
| 2011/0208710 A1 | 8/2011 | Lesavich | |
| 2012/0278622 A1 | 11/2012 | Lesavich et al. | |
| 2014/189792 A1 | 7/2014 | Lesavich et al. | |
| 2015/0379301 A1 | 12/2015 | Lesavich et al. | |
| 2016/0321654 A1 | 11/2016 | Lesavich et al. | |
| 2021/0362948 A1 | 11/2021 | Scarth | |

FOREIGN PATENT DOCUMENTS

JP 6217472 B2 3/2014

\* cited by examiner

*Primary Examiner* — Corey N Skurdal
(74) *Attorney, Agent, or Firm* — Lesavich High-Tech Law Group, S.C.; Stephen Lesavich

(57) ABSTRACT

A fort lift tool holder apparatus. The fork lift tool holder includes a spindle with a cutting component for storing and dispensing a roll of materials for wrapping a pallet of goods, storing for plural types of cups and/or bottles and plural types of writing utensils. The fork lift tool holder includes connection components usable on plural different types of fork lifts with plural different types of structural components (e.g. round, square, rectangular, etc.).

20 Claims, 10 Drawing Sheets

SIDE VIEW

TOP VIEW

FRONT VIEW

SIDE VIEW

TOP VIEW

SIDE VIEW

SIDE VIEW

TOP VIEW

FORK LIFT TOOL HOLDER APPARATUS

CROSS REFERENCES TO OTHER APPLICATIONS

Not applicable.

FIELD OF INVENTION

This application relates to fork lifts. More specifically, it relates to a fork lift tool holder apparatus.

BACKGROUND OF THE INVENTION

A fork lift (also called industrial truck, lift truck, jitney, hi-lo, fork truck, fork hoist, mini-fork lifts and forklift truck) is a powered industrial truck used to lift and move materials over short distances. A fork lift includes two power-operated prongs at the front that can be slid under heavy loads and then raised for moving and stacking materials in warehouses, shipping depots, etc.

One of the common tasks performed by an operator of a fork lift is to obtain a pallet of goods such as a pallet of boxes, cans, bottles, furniture and then wrap the pallet with a roll of wrapping materials so the contents of the pallet stay in place during transport.

There are several problems with an operator of a fork lift collecting and wrapping a pallet of goods.

One problem is that the operator must carry a separate roll of wrapping materials on a spindle and cutting knife to cut a desired length off the roll of wrapping materials. Such spindles are often lost or misplaced causing delay of wrapping of a pallet of materials.

Another problem is that an operator of a fork lift is typically required to mark a pallet of materials after wrapping with a marker that can easily be misplaced.

Another problem is that an operator of a fork lift is typically required to write on a paper invoice, bill of materials, etc. with a pen or pencil after collecting a pallet of materials after wrapping. The pen or pencil can be easily misplaced.

Another problem is that most fork lift dashboards do not include any storage compartments to store cups, bottles for liquids like water, coffee, soda, etc. and electronic devices such as cell phones, electronic tablets, etc. The electronic devices often are used for order information and include orders for specific goods and provide collection instructions and location information for the specific goods to be included on a pallet for a specific order.

Another problem is that tool holders that do exist for fork lifts are typically designed for specific fork lift model with specific structural components (e.g., round tubing structural components and cannot be used on another fork lift model with other specific structural components (e.g., square tubing structural components, etc.)

Thus, it is desirable to solve some of the problems associated with tool holders for fork lifts.

SUMMARY OF THE INVENTION

In accordance with preferred embodiments of the present invention, some of the problems associated with fork lift tool holders are overcome. A fork lift tool holder apparatus is presented.

The fork lift tool holder includes a spindle with a cutting component for storing and dispensing a roll of materials for wrapping a pallet of goods, storing for plural types of cups and/or bottles and plural types of writing utensils. The fork lift tool holder includes connection components usable on plural different types of fork lifts with plural different types of structural components (e.g. round, square, rectangular, etc.).

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Fork Lift Tool Holder Apparatus

Figure 1:
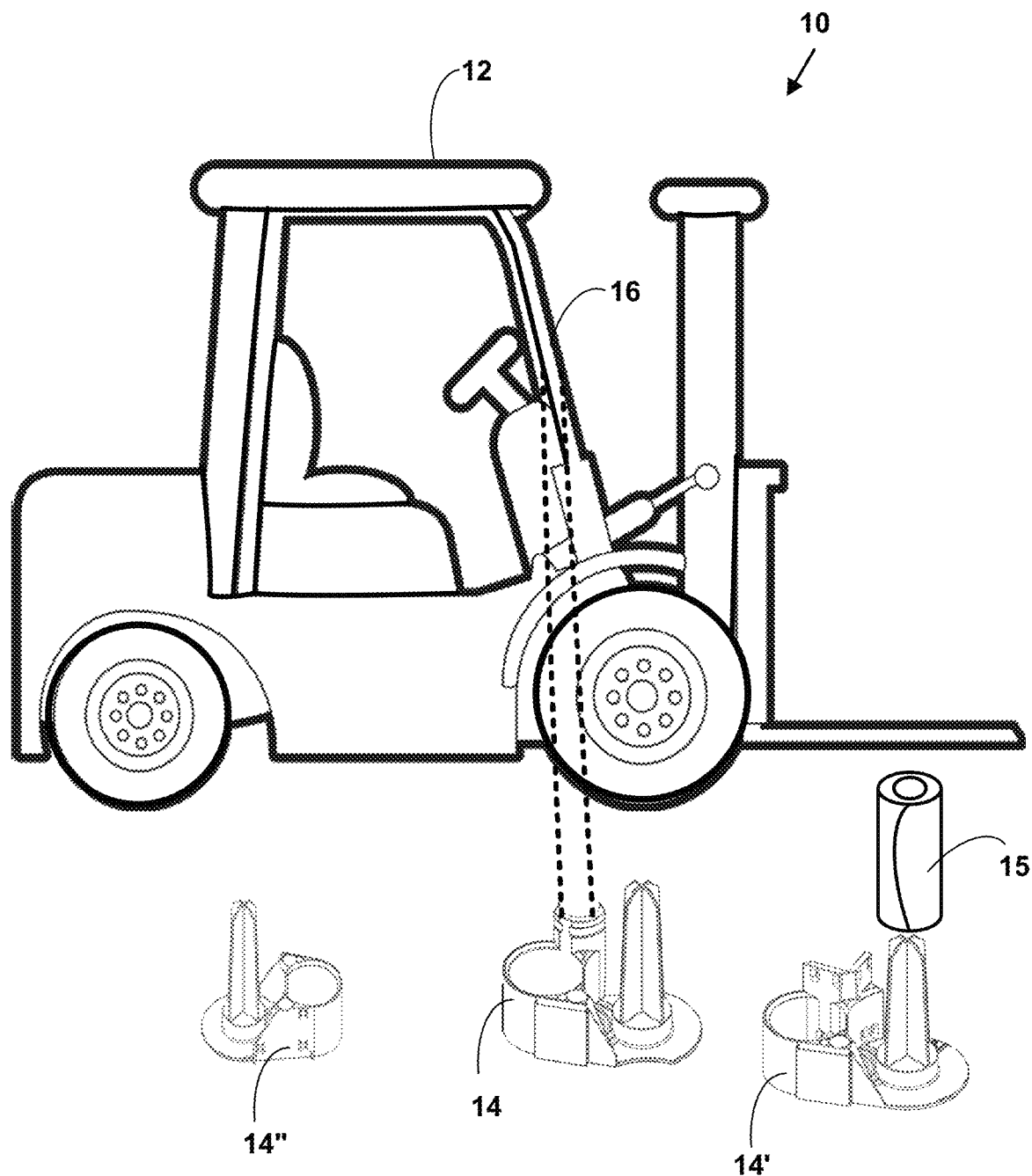
FIG. 1 is a block diagram illustrated a side vide of a fork lift and a perspective view of fork lift tool holder apparatus.

FIG. 1 is a block diagram 10 illustrated a side vide of a fork lift 12 and a perspective view of fork lift tool holder apparatus 14.

A fork lift 12 (also called industrial truck, lift truck, jitney, hi-lo, fork truck, fork hoist, and forklift truck) is a powered industrial truck used to lift and move materials over short distances. A fork lift 12 includes two power-operated prongs at the front that can be slid under heavy loads and then raised for moving and stacking materials in warehouses, shipping depots, etc.

The fork lift 12 further includes a mini-fork lift, a reach truck fork lift and/or an order picker forklift (e.g., those sold by the CROWN company of Toledo, Ohio, etc.). A mini forklift is any type of small forklift. A mini-fork lift is one type of functional narrow aisle forklifts used in very small spaces. A reach truck fork lift includes forklifts used in narrow aisle applications, such as warehouses. Reach truck fork lifts are designed to have two outer legs that help distribute the load and a single set of wheels in the back. An order picker forklift is a fork lift used to help operators pick and deliver materials needed for filling out orders. Order picker forklifts are designed take the forklift operator up to a rack and down from a rack with and/or without a load.

However, the present invention is not limited to such an embodiments and other types of fork lifts can be used to practice the invention.

In FIG. 1, the fork lift tool holder apparatus 14 connects to a structural component 16 of the fork lift 12. The fork lift tool holder apparatus 14 is attached within reach of an operator of the fork lift 12 on the structural component 16.

The fork lift 12 is illustrated with circular and/or oval shaped structural components. However, the present invention is not limited to such an embodiment and other shaped structural components on other types of fork lifts can be used to practice the invention.

The fork lift tool holder apparatus 14 is a component that is dynamically attachable and removable from the fork lift 12 and is used to hold tools essential to an operator of the fork lift 12.

Figure 2:
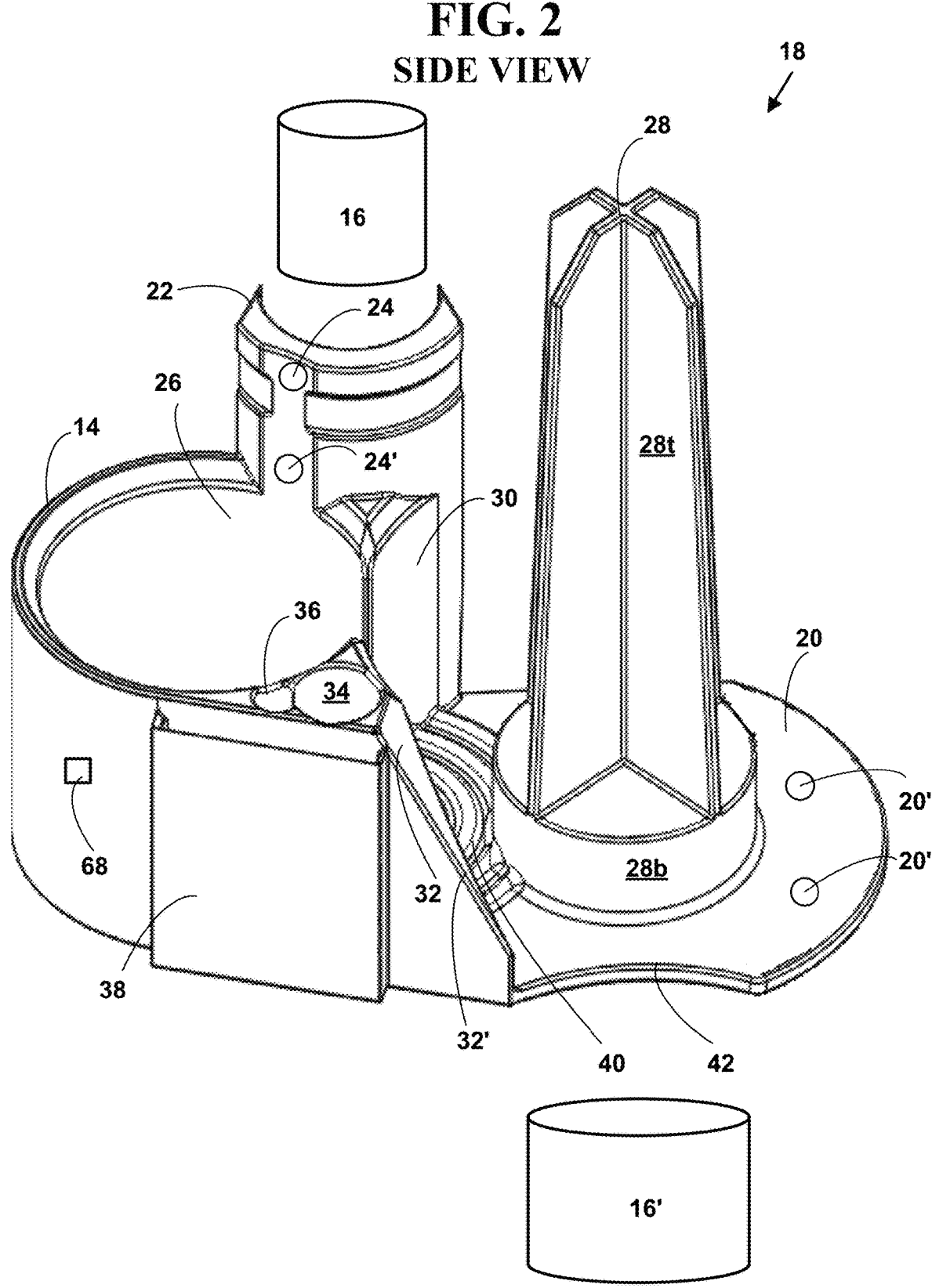
FIG. 2 is a block diagram illustrating a side perspective view of a fork lift tool holder apparatus.

FIG. 2 is a block diagram 18 illustrating a perspective view of a fork lift tool holder apparatus 14.

The fork lift tool holder apparatus 14 includes, but is not limited to, a body component 20 comprising, one or more connection components 22, 42 for connecting the body component 20 to a structural component 16 on a fork lift 12, selected ones (e.g., 22) of the one or more connection components 22, 42 including one or more female receptacles 24, 24' (only two of which are illustrated for simplicity) for receiving a connection means to connect the connection component 22 to the structural component 16 on the fork lift 12, a cup holder component 26 for receiving a cup or a bottle including a liquid, a spindle component 28 for engaging a roll of wrapping material 15, one or more spindle guide components 30 (one of which is illustrated for simplicity) for guiding rotation of the roll of wrapping material 15 around the spindle component 28; a spindle cut component 32 for cutting off a desired length of the wrapping material 15 from the spindle component 28; a first writing utensil component 34 for engaging and storing a writing utensil of a first size, a second writing utensil component 36 for engaging and storing a second writing utensil of a second size, an electronic holding component 38 for engaging and storing an electronic device; and plural reenforcing components 40 engaging a bottom portion of the spindle component 28 to strengthen the body component 20 to prevent bending and flexing of the body component 20 on the fork lift 12 when the roll of wrapping material 15 is placed on and rotated on the spindle component 28.

The connection component 22 for connecting the body component 20 to the structural component 16 on the fork lift 12, includes one or more receptacles 20, 20' (only two of which are illustrated for simplicity) for receiving a connection means (e.g., screw, bolt, rivet, zip tie, etc.) to connect the connection component 22 to the structural component 16 on the fork lift 12 for a round shaped (e.g., circular, oval, etc.) connection component 22 with a curved surface.

Figure 3:
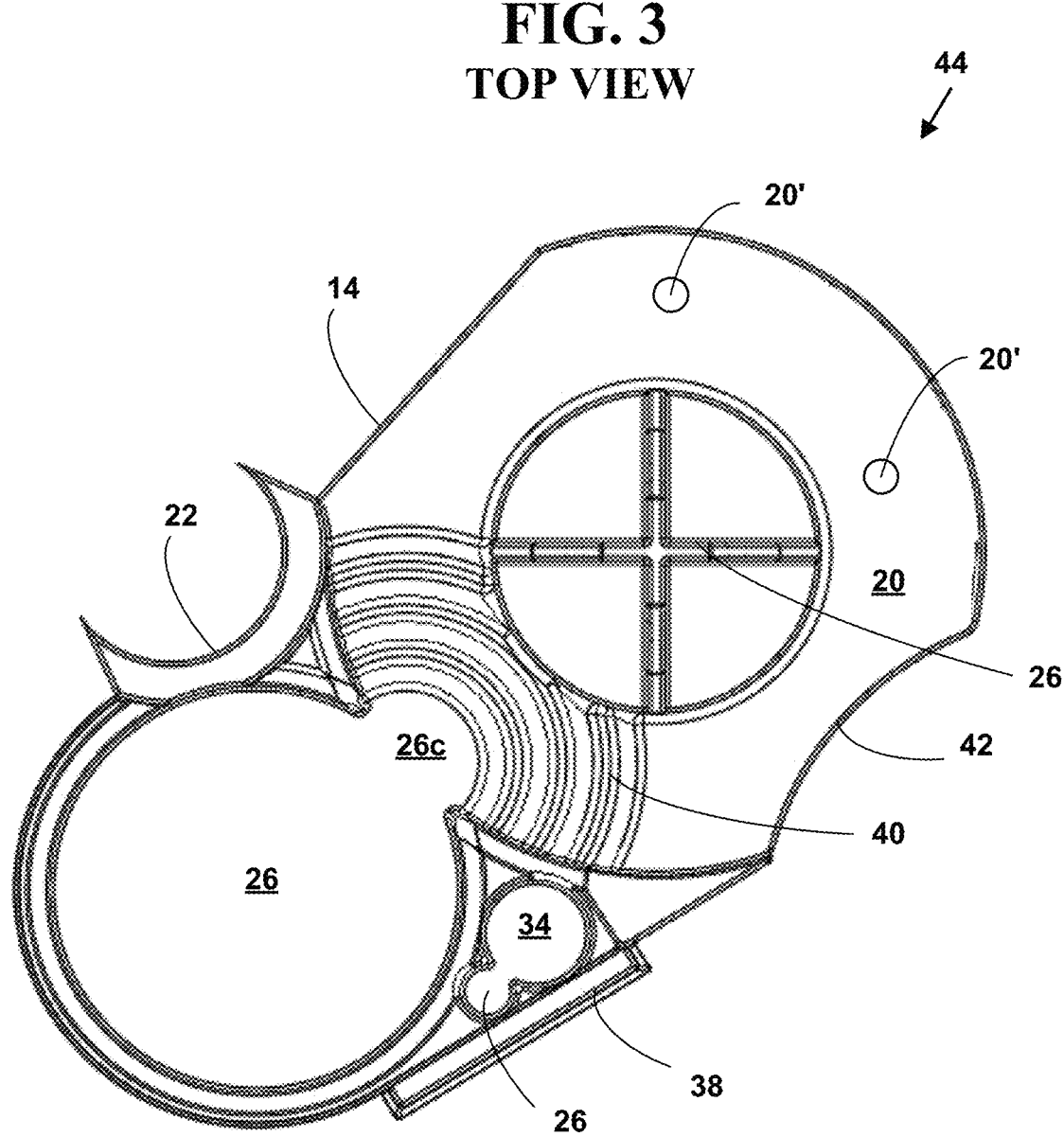
FIG. 3 is a block diagram illustrating a top view of a fork lift tool holder apparatus.
Figure 4:
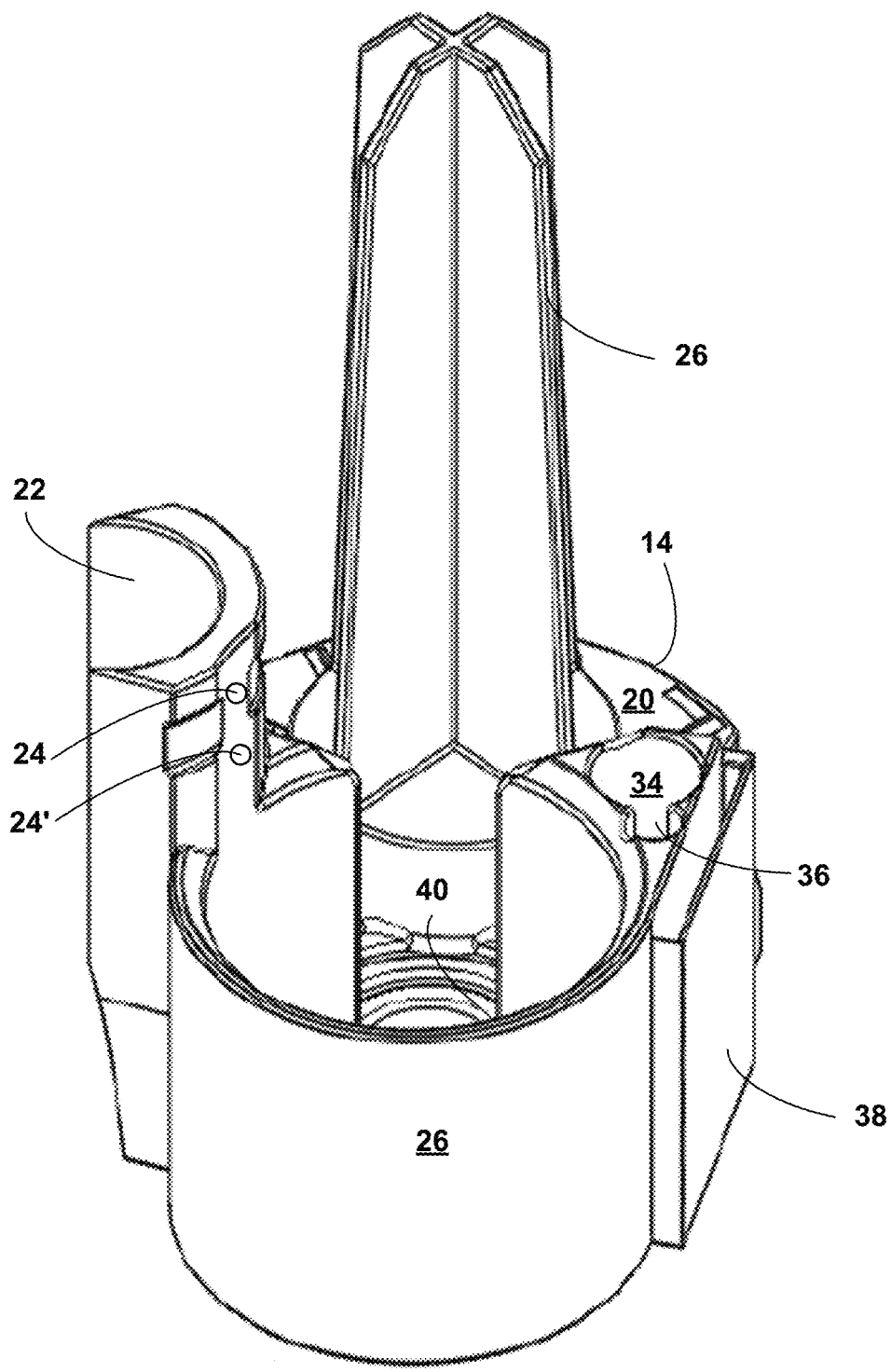
FIG. 4 is a block diagram illustrating a front perspective view of a fork lift tool holder apparatus.

FIGS. 2-4 illustrate an apparatus 12 that can be inserted specifically between two structural components 16 of the fork lift with connection components 22, 42 on a specific type of fork lift model. In such an embodiment, connection component is connected to a first round and/or oval structural component 22 and connection component 42 is braced against and fits withing a second, round structural component 16'. However, the present invention is not limited to such embodiments and other embodiment can be used to practice the invention.

Figure 5:
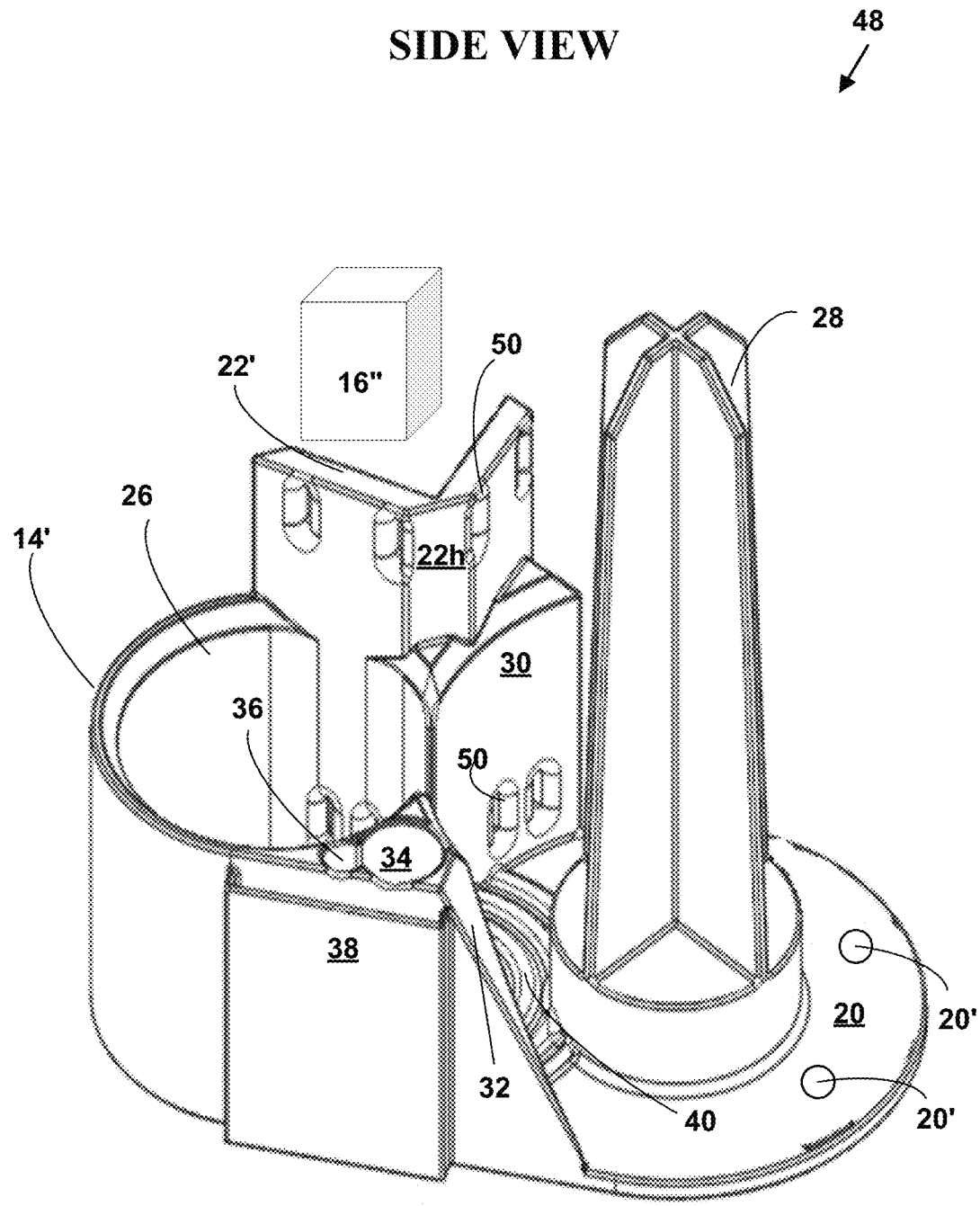
FIG. 5 is a block diagram illustrating a front perspective view of a fork lift tool holder apparatus.
Figure 6:
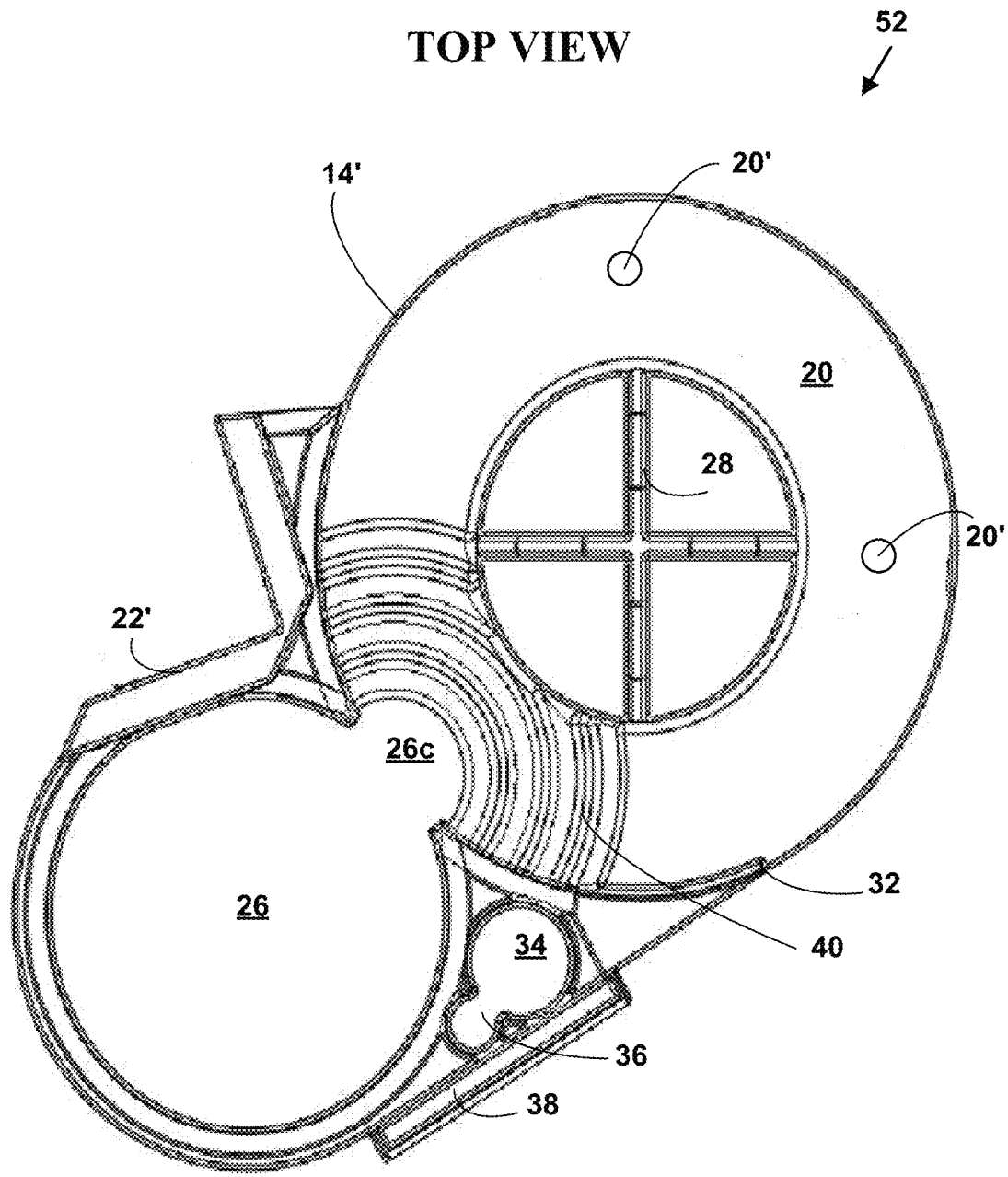
FIG. 6 is a block diagram illustrating a top view of a fork lift tool holder apparatus.
Figure 7:
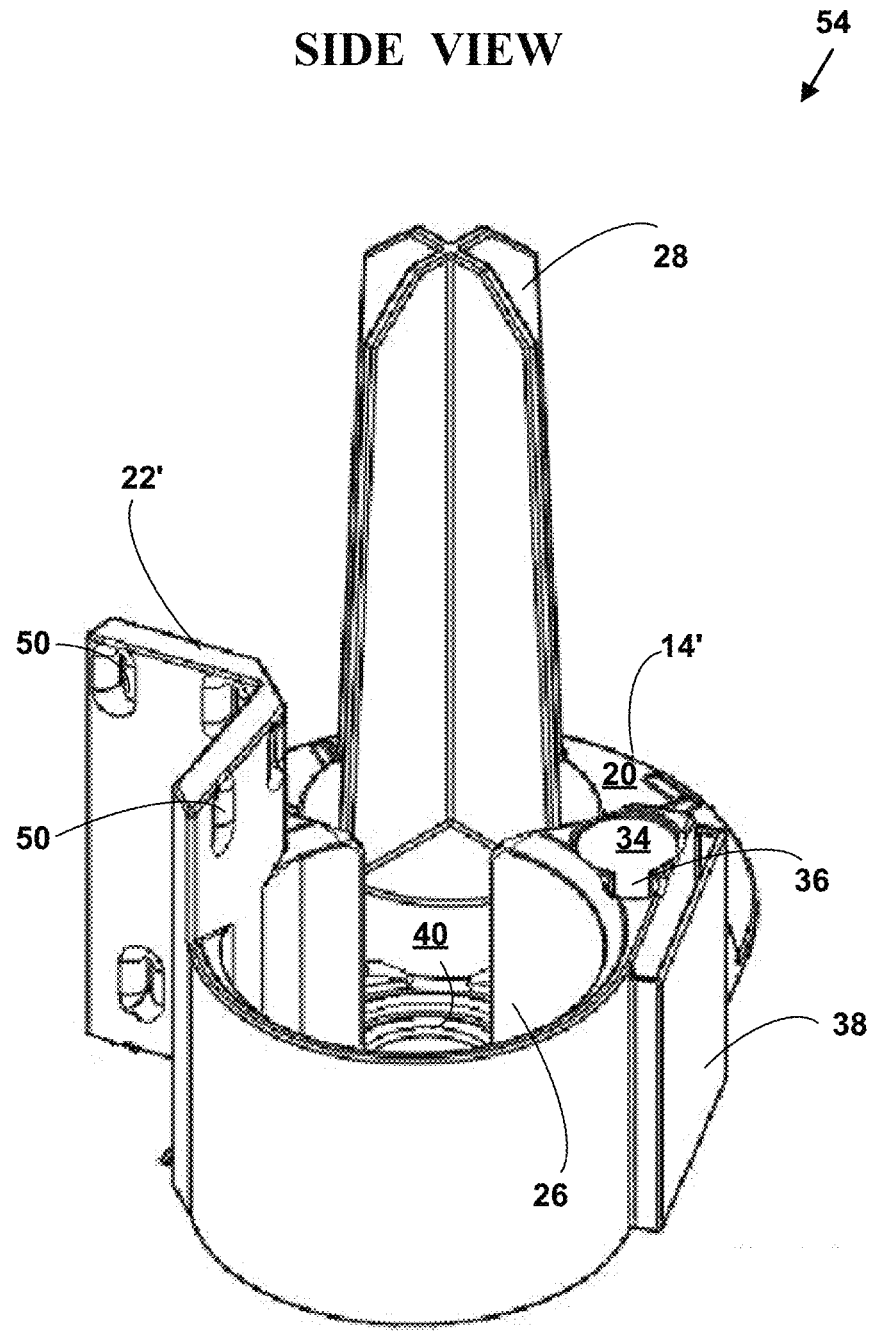
FIG. 7 is a block diagram illustrating a side perspective view of a fork lift tool holder apparatus.

FIGS. 5-7 illustrates a connection component 22', for a polygon shaped structural component on the fork lift with angular surfaces. (e.g., square, rectangle, triangle, etc.).

Figure 8:
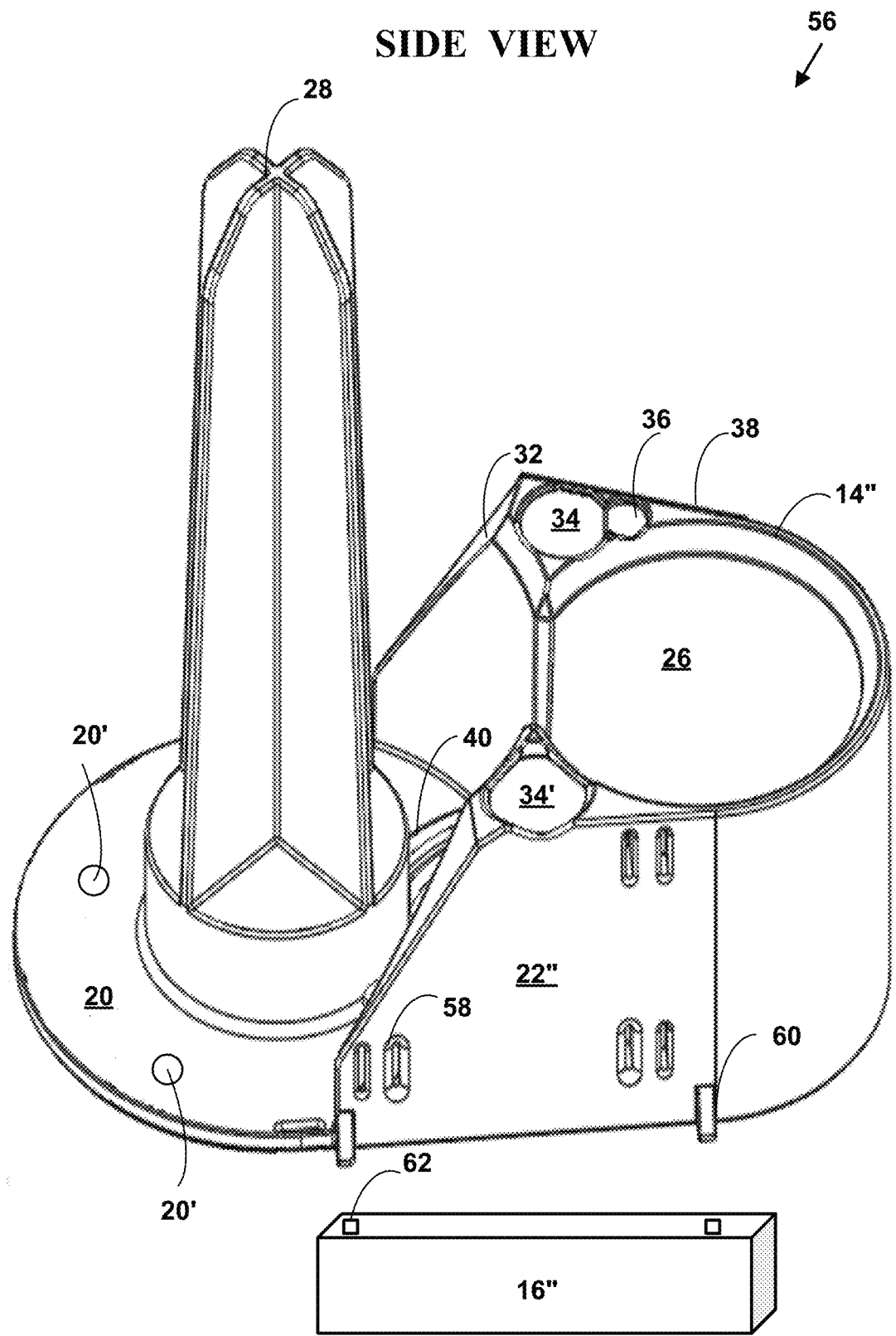
FIG. 8 is a block diagram illustrating a side perspective view of a fork lift tool holder apparatus.
Figure 9:
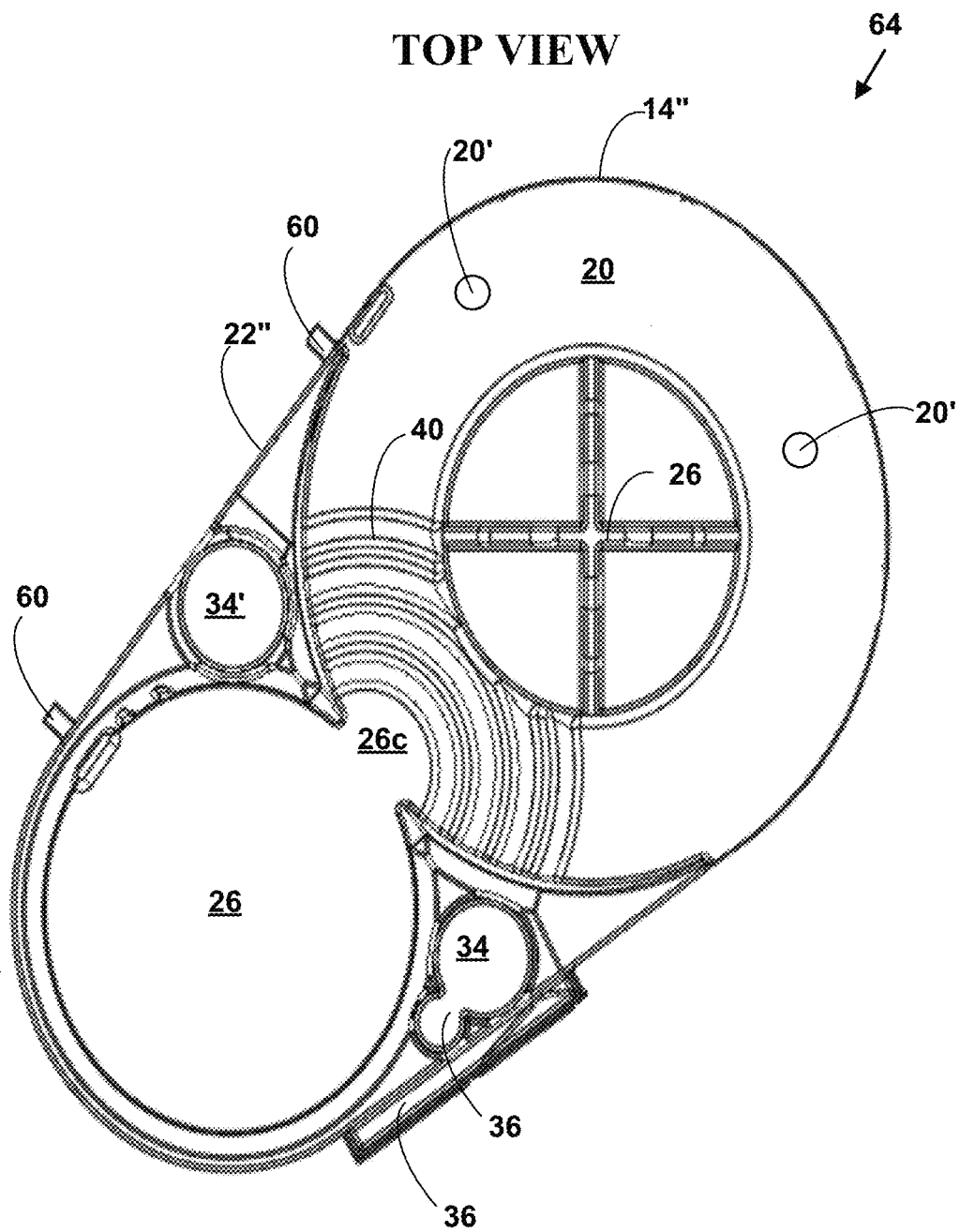
FIG. 9 is a block diagram illustrating a top perspective view of a fork lift tool holder apparatus.

FIG. 8-9 illustrates a connection component 22", for structural components with a large flat surface.

In one embodiment, the connection components 22, 22', 22" includes connections component that are interchangeable, dynamically attachable and removable fork lift tool holder apparatus 14.

However, the present invention is not limited to such embodiments and other embodiments can be used to practice the invention.

The cup holder component 26 includes a female receptacle for receiving a cup and/or a bottle including a hot and/or cold liquid (e.g., coffee, tea, water, soda, etc.) For example, the cup holder 26 is specifically sized with a diameter to hold at least a sixteen-ounce cup (about 473 milliliters (ml)) cup container (about 2.4 inches or about 60 millimeters (mm)) and/or a twelve-ounce (about 355 ml) metal, glass and/or plastic water bottle container (about 2.7 inches or about 70 mm) and a depth of about eight inches (about 20.32 centimeters (cm) deep to hold such cups and/or bottles. However, the present invention is not limited to such an embodiment and other sizes can be used for the cup holder 26 to practice the invention.

The spindle component 28 engages a roll of wrapping material 15 and includes a male component about twenty inches high (about 50.8 cm) for engaging a female receptacle on a roll of wrapping material 15. The spindle component 28 engages rolls of wrapping material 15 that are twelve inches through eighteen inches in height with a weight of about six pounds (about 2.72 kilograms (kg)) to about ten pounds (about 4.55 kg). However, the present invention is not limited to such embodiments and other sizes and weights can be used to practice the invention.

In one embodiment, the spindle component 28 is fixed and the roll of materials is rotated around the fixed spindle component 28. In another embodiment, the spindle component 28 rotates and the roll of wrapping material 15 is fixed. A top component 28t rotates around a bottom component 28b of the spindle component 28 allowing easier and quicker unwrapping of a portion of the roll of wrapping materials 15. However, the present invention is not limited to such embodiments and other embodiments can be used to practice the invention.

The roll of wrapping material 15 is used by an operator of the fork lift 12 to wrap a pallet of materials (e.g., boxes, cans, bottles, furniture, etc.) so the pallet of materials stay in place and together when they are moved with the fork lift 12.

The roll of wrapping material 15 includes, but not limited to, plastic (e.g., Linear Low-Density Polyethylene (LLDPE), Virgin Polyethylene with a Volatile Corrosion Inhibitor (VCI) coating, etc.) paper and/or other types of wrapping materials. The plastic wrap includes, but is not limited to, color tinted wraps, opaque wraps, anti-static wraps, pallet stretch netting and/or vented pallet wraps and/or other types of material wraps. However, the present invention is not limited to such embodiments and other sizes and weights can be used to practice the invention.

The spindle component 28 one or more spindle guide components 30 (one of which is illustrated for simplicity) for guiding rotation of the roll of wrapping material 15 around the spindle component 28 and a spindle cut component 32 for cutting off a desired length of the roll of wrapping material 15 from the spindle component 28. The spindle cut component 32 includes a sharped metal, plastic and/or composite material edge component 32' for easily cutting a selected portion of the roll of wrapping material 15 a desired length by pulling the desired length of wrapping material across the spindle cut component 32. In such an embodiment, the spindle cut component 32 eliminates the need for an operation of the forklift to carry a cutting tool such as a knife, a box cutter, a razor blade tool, etc. However, the present invention is not limited to such embodiments and other embodiments can be used to practice the invention.

The first writing utensil component 34 includes a female receptacle component for engaging and storing a writing utensil of a first size, includes a diameter of about one inch (about 2.54 cm) and a depth of about four inches (about 10.16 cm) for a marker. The four-inch depth is deep enough to securely hold the second writing utensil in place and prevent it interfering with other operations of the apparatus 14 and at a same time leave enough of the second writing utensil available for easy grasping by the operator of the fork lift 12. The marker is used to mark the roll of wrapping materials 15 with desired markings. However, the present invention is not limited to such an embodiment and other diameters and/or depths of the first writing utensil component 34 can be used to practice the invention.

The second writing utensil component 36 includes a female receptacle component for engaging and storing a writing utensil of a second size, includes a diameter of about one half-inch (about 1.27 cm) and a depth of about four inches (about 10.16 cm) for a pen and/or pencil. The four-inch depth is deep enough to securely hold the second writing utensil in place and prevent it interfering with other operations of the apparatus 14 and at a same time leave enough of the second writing utensil available for easy grasping by the operator of the fork lift 12. The pen and/or pencil is used to papers materials (e.g., product sheets, invoices, manifests, etc.) with desired markings. However, the present invention is not limited to such an embodiment and other diameters and/or depths of the second writing utensil component 36 can be used to practice the invention.

In one embodiment, the first writing utensil component 34 for engaging and storing a writing utensil of a first size and the second writing utensil component 36 includes a female receptacle component for engaging and storing a writing utensil of a second size include an identical size. However, the present invention is not limited to such an embodiment is and other embodiments can be used to practice the invention.

The electronic holding component 38 is a female receptacle for engaging and storing an electronic device such as a mobile phone, electronic tablet, Internet appliance, personal digital assistant (PDA), Internet of Things (IoT) devices and/or other type of electronic device. IoT devices include electronic device with sensors, processing ability, software and other technologies that connect and exchange data with other devices and systems over the Internet or other communications networks. In one embodiment, the electronic storage component 38 is about six inches (15.24 cm) long, about four inches wide (about 10.14 cm) and an opening of about one inch (about 2.54 cm) to hold a mobile phone. In one embodiment, the mobile phone is connected to an inventory system in a warehouse, shipping dock, etc. where the fork lift 12 is being used. In another embodiment, the mobile phone is a personal device for the operator of the fork lift 12 and is not part of any inventory system. However, the present invention is not limited to such an embodiment and other diameters and/or depths of the electronic holding component can be used to practice the invention.

In another embodiment, the electronic storage component 38 is about eight inches wide (about 20.32 cm) and ten inches (25.40 cm) long with an opening of about four inches (10.14 cm) to hold an electronic tablet (e.g., APPLE IPAD, SAMSUNG GALAXY TABLE, AMAZON FIRE TABLE, GOOGLE TABLET, etc.). In one embodiment, the electronic tablet is connected to an inventory system in a warehouse, shipping dock, etc. where the fork lift 12 is being used. However, the present invention is not limited to such an embodiment and other diameters and/or depths of the electronic holding component can be used to practice the invention.

In another embodiment, the electronic storage component 38 is used to store shipping labels and/or a note pad and/or product sheets, invoices, manifests, bills of materials and/or other papers. However, the present invention is not limited to such an embodiment.

The plural reenforcing components 40 strengthen the body component 20 to prevent bending and flexing of the body component 20 on the fork lift 12 when the roll of wrapping material 15 is placed on and rotated on the spindle component 28. The roll of wrapping material 15 weighs about six pounds (about 2.72 kilograms (kg)) to about ten pounds (about 4.55 kg) or more. The plural reenforcing components 40 strengthen the body component 20 to counteract the weight the roll of wrapping material 15 and rotational forces generated when unrolling the roll of wrapping material 15.

FIG. 2 illustrates reenforcing components 40 of a half circle shape. It has been determined experimentally that plural reenforcing components 40 of plural rows of half-circle shapes provide an optimal reenforcing shape for the apparatus 14. In one embodiment, the plural rows of half-circle shapes include a pre-determined height of about 0.25 inches to about 0.5 inches (about 6.35 mm to about 12.7 mm) in height above a top surface of the body component 20. However, the present invention is not limited to such embodiments, shapes and measurements and other embodiments with other shapes and measurements can be used practice the invention.

In one embodiment, the reenforcing components 40 includes a material with fiberglass fibers. In another embodiment, the reenforcing components 40 includes composite materials. In another embodiment, the reenforcing components 40 includes carbon fiber reinforced nylon filaments (e.g., used with a Fused Deposition Modeling (FDM) 3D printing process, etc.). FDM technology includes a process of making physical objects by building up successive layers of material with an extruded thermoplastic filament. However, the present invention is not limited to such embodiments and other embodiments can be used to practice the invention.

FIG. 3 is a block diagram illustrating a top view 44 of a fork lift tool holder apparatus 14.

FIG. 3 also illustrates a portion of the cup holder component 26 also includes a portion 26c which includes a receptacle portion for a handle of a cup.

FIG. 4 is a block diagram illustrating a front perspective view 46 of a fork lift tool holder apparatus 14.

FIGS. 1-4 illustrate a fork lift tool holder apparatus 14 that attaches to a fork lift 14 with round and/or oval structural components 16, 16'

FIG. 5 is a block diagram 48 illustrating a front perspective view of a fork lift tool holder apparatus 14'.

In FIG. 5, the connection component 22' comprises a V-shaped component including two rectangle components with plural female connection receptacles 50 for attaching the fork lift tool holder apparatus 14' to a structural component 16 on the fork lift 12 that includes a polygonal surface (e.g., a triangular, square and/or rectangular shaped structural component 16".

In one embodiment, a connection component 22' comprises a fixed V-shaped component with plural female connection receptacles 50. In another embodiment, the connection component 22' comprises a hinged V-shaped component 22h with plural female connection receptacles 50. The hinged V-shaped component 22h is dynamically adjustable. However, the present invention is not limited to these embodiments and other embodiments can be used to practice the invention.

FIG. 6 is a block diagram 52 illustrating a top view of a fork lift tool holder apparatus 14'.

FIG. 7 is a block diagram 54 illustrating a side perspective view of a fork lift tool holder apparatus 14'.

FIG. 8 is a block diagram 54 illustrating a side perspective view of a fork lift tool holder apparatus 14".

In FIG. 8, a connection component 22" comprises a flat component with plural female connection receptacles 58 and plural male connection receptacles 60 (only two of which are illustrated for simplicity) for attaching the fork lift tool holder apparatus 14" to a structural component 16 on the fork lift 12 that includes a large flat surface on structural component 16" with plural female receptacles 62 for accepting the plural male receptacles 60.

FIG. 8 includes a third writing utensil component 34' for engaging and storing a writing utensil of a third size. FIG. 8 illustrates the first writing utensil component 34 and the second writing utensil 34' of an identical size (e.g., a size for a marker, etc.) However, the present invention is not limited to such an embodiment and other embodiments can be used to practice the invention.

FIG. 9 is a block diagram 64 illustrating a top perspective view of a fork lift tool holder apparatus 14".

Figure 10:
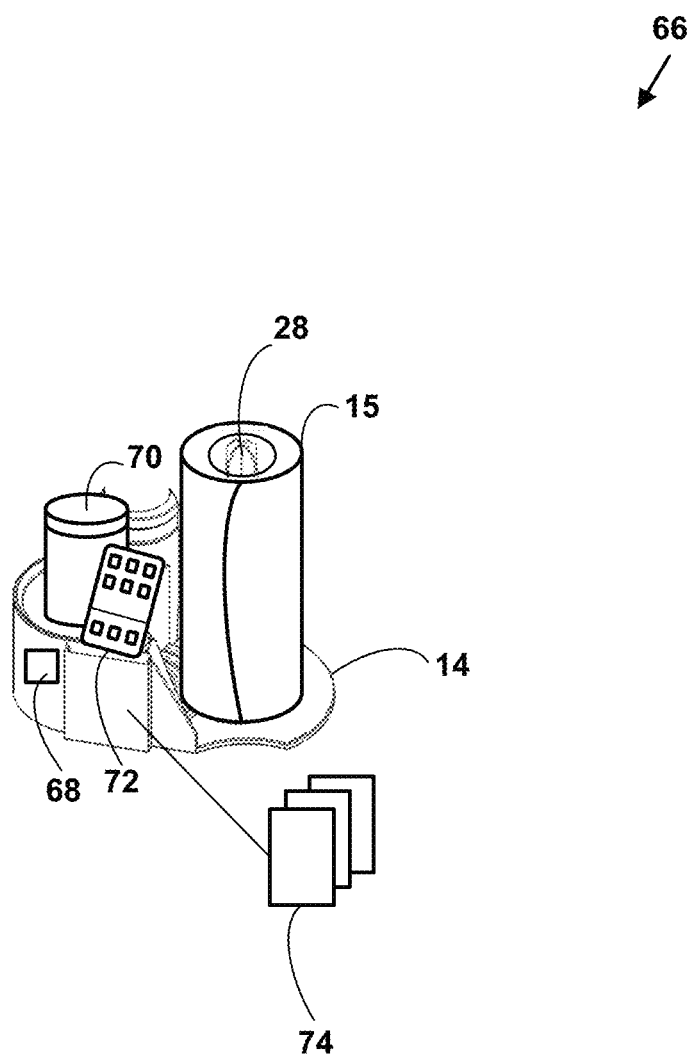
FIG. 10 is a block diagram illustrated a side vide of a roll of wrapping material and a perspective view of a fork lift tool holder apparatus.

FIG. 10 is a block diagram 66 illustrated a side vide of a roll of wrapping material 15 and a perspective view of a fork lift tool holder apparatus 14.

FIG. 10 illustrates the fork lift tool holder apparatus 14 without an attachment to the fork lift 12 to illustrate additional features of the invention.

In one embodiment, the fork lift tool holder apparatus 14 can also be used in a stand-alone mode as a stand-alone tool platform that can be carried around by an operator of the fork lift 12 without attachment to the fork lift 12. However, the present invention is not limited to such an embodiment and other embodiments can be used to practice the invention.

In a preferred embodiment, the fork lift tool holder apparatus 14, 14', 14" is used attached to the fork lift 12.

In one embodiment, the fork lift tool holder apparatus 14 includes a Global Position System (GPS) component and/or a Radio Frequency Identifier (RFID) component 68 to allow tracking of the fork lift tool holder apparatus 14 and the corresponding fork lift 12 as it is moved around in a warehouse, factory, etc. However, the present invention is not limited to such an embodiment and other embodiments can be used to practice the invention, with and/or with a GPS component.

The term "GPS" as used herein includes, but is not limited to, Global Positioning System (GPS) is a worldwide radio-navigation system formed from the constellation of satellites and their ground stations. Global Positioning System tracking is a method of working out exactly where something is. A GPS tracking system, for example, may be placed in a vehicle, on a cell phone, or on special GPS devices, which can either be a fixed or portable unit. GPS works by providing information on exact location. It can also track the movement of a vehicle or person.

Radio Frequency Identifier (RFID) component includes an RFID tag and/or an RFID sensor. However, the present invention is not limited to such RFID components and other types of RFID components can be used to practice the invention.

An "RFID tag" is an object that can be applied to or incorporated into a product, animal, or person for the purpose of identification and/or tracking using radio frequency (RF) signals.

An "RFID sensor" is a device that measures a physical quantity and converts it into an RF signal which can be read by an observer or by an instrument or a communications network such the Internet, a Local Area Network (LAN), etc.

FIG. 10 also illustrates a cup 70 that is placed into the cup holder 26 and a mobile phone 72 that is placed into the electronic holding component 38 and shipping labels 74 that can also be placed into the electronic holding component 38.

Components of the fork lift tool holder apparatus 14, 14', 14" are individually manufactured, machined, three-dimensional (3D) printed by a 3D printer, extruded and/or pultruded including metal, rubber, wood, plastic and/or composite materials and/or combinations thereof. However, the present invention is not limited to such an embodiment and other embodiments with other manufacturing process and other materials can be used to practice the invention.

In one embodiment, all components of the fork lift tool holder apparatus 14, 14', 14" are manufactured machined, 3D printed by a 3D printer, extruded and/or pultruded as a one-piece integral unit. In another embodiment, various components of the fork lift tool holder apparatus 14, 14', 14" are manufactured machined, 3D printed by a 3D printer, extruded and/or pultruded, or a combination thereof, separately and are assembled into a final fork lift tool holder apparatus 14, 14', 14". However, the present invention is not limited to such embodiments and other embodiments may be used to practice the invention.

"Manufacturing" includes the process of making items from raw materials. "Machining" includes various processes in which a piece of raw material is cut into a desired final shape and size by a controlled material-removal process.

A "3D printer" includes 3D printing or "Additive manufacturing." 3D printing is a process of making a three-dimensional solid object of virtually any shape from a digital model. 3D printing is achieved using an "additive process," where successive layers of material (e.g., metal, plastic, etc.) are laid down in different shapes. 3D printing is also considered distinct from traditional manufacturing and/or machining techniques, which mostly rely on the removal of material by methods such as cutting or drilling and are "subtractive" processes.

In one embodiment, the 3D printing process includes a Fused Deposition Modeling (FDM) 3D printing process and/or a Stereolithography (SLA) 3D printing process. FDM technology includes a process of making physical objects by building up successive layers of material with an extruded thermoplastic filament. SLA technology includes a form of 3D printing technology used for creating models, prototypes, patterns, and production parts in a layer-by-layer fashion using photochemical processes by which light causes chemical monomers and oligomers to cross-link together to form polymers to create physical objects. However, the present invention is not limited to these 3D printing processes and other 3D printing processes can be used to practice the invention.

"Extrusion" is a manufacturing process where a material such as aluminum, plastic, etc. is pushed and/or drawn through a die to create long objects of a fixed cross-section.

Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

The feedstock may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material. "Pultrusion" is a manufacturing process for producing continuous lengths of materials. Pultrusion raw materials include metals such as aluminum, etc. or a liquid resin mixture (e.g., containing resin, fillers and specialized additives) and reinforcing fibers (e.g., fiberglass, composite materials, etc.). The process involves pulling these raw materials (rather than pushing as is the case in extrusion) through a heated steel forming die using a continuous pulling device. The reinforcement materials are in continuous forms such as rolls of fiberglass mat or doffs of fiberglass roving. As the reinforcements are saturated with the resin mixture in the resin impregnator and pulled through the die, the gelation (or hardening) of the resin is initiated by the heat from the die and a rigid, cured profile is formed that corresponds to the shape of the die.

There are also protruded laminates. Most pultruded laminates are formed using rovings aligned down the major axis of the part. Various continuous strand mats, fabrics (e.g., braided, woven and knitted), and texturized or bulked rovings are used to obtain strength in the cross axis or transverse direction.

The pultrusion process is normally continuous and highly automated. Reinforcement materials, such as roving, mat or fabrics, are positioned in a specific location using preforming shapers or guides to form a pultrusion. The reinforcements are drawn through a resin bath where the material is thoroughly coated or impregnated with a liquid thermosetting resin. The resin-saturated reinforcements enter a heated metal pultrusion die. The dimensions and shape of the die define the finished part being fabricated. Inside the metal die, heat is transferred initiated by precise temperature control to the reinforcements and liquid resin. The heat energy activates the curing or polymerization of the thermoset resin changing it from a liquid to a solid. The solid laminate emerges from the pultrusion die to the exact shape of the die cavity. The laminate solidifies when cooled and it is continuously pulled through the pultruson machine and cut to the desired length. The process is driven by a system of caterpillar or tandem pullers located between the die exit and the cut-off mechanism.

A "composite material" is a combination of two materials with different physical and chemical properties. The different physical or chemical properties of the two materials remain separate and distinct at the macroscopic or microscopic scale within the finished structure. Common polymer-based composite materials, include at least two parts, a substrate (e.g., fibers, etc.) and a resin.

When the two materials are combined, they create a composite material which is specialized material to do a certain job, for instance to become stronger, lighter or resistant to electricity. Composite materials also improve strength and stiffness of the materials. One reason for their use over traditional materials is because they improve the properties of their base materials and are applicable in many situations.

The composite materials include, but are not limited to, "Fiber-reinforced polymers" (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

In one embodiment, components of the fork lift tool holder apparatus are produced in plural different colors including safety colors of red, yellow and/or orange and/or specific colors for a desired company. However, the present invention is not limited to such embodiments and other embodiments can be used to practice the invention.

A fort lift tool holder apparatus is presented herein. The fork lift tool holder includes a spindle with a cutting component for storing and dispensing a roll of materials for wrapping a pallet of goods, storing for plural types of cups and/or bottles and plural types of writing utensils. The fork lift tool holder includes connection components usable on plural different types of fork lifts with plural different types of structural components (e.g. round, square, rectangular, etc.).

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described here3 in.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. A fork lift tool holder apparatus, comprising in combination:

a body component including one or more receptacles for receiving one or more connection means to connect the body component to a fork lift, comprising:

one or more connection components for connecting the body component to a structural component on the fork lift, selected ones of the one or more connection components including one or more receptacles for receiving one or more connection means to connect the one or more connection components to the structural component on the fork lift;

a cup holder component for receiving a cup or a bottle including a liquid;

a spindle component for engaging a roll of wrapping material;

a spindle guide component for guiding rotation of the roll of wrapping material around the spindle component;

a spindle cut component for cutting off a desired length of the wrapping material from the spindle component;

a first writing utensil component for engaging and storing a writing utensil of a first size;

a second writing utensil component for engaging and storing a second writing utensil of a second size;

an electronic storage component for engaging and storing an electronic device; and a plurality of reenforcing components on the body component engaging a bottom portion of the spindle component to strengthen the body component, to prevent bending and flexing of the body component when the roll of wrapping material is placed on and rotated on the spindle component.

2. The fork lift tool holder apparatus of the claim 1 wherein, the one or more connection components includes a circular, oval and polygonal shape.

3. The fork lift tool holder apparatus of the claim 2 wherein, the polygonal shape includes a triangle, square or rectangle shape.

4. The fork lift tool holder apparatus of the claim 1 wherein, the one or more connection components includes a pair of rectangles in a V-shape.

5. The fork lift tool holder apparatus of the claim 1 wherein, the V-shape includes a hinged component.

6. The fork lift tool holder apparatus of the claim 1 wherein, components of the fork lift tool holder including metal, rubber, wood, plastic, composite materials or combinations thereof.

7. The fork lift tool holder apparatus of the claim 1 wherein, the spindle component includes a top portion of the spindle component affixed to a bottom portion of the spindle component.

8. The fork lift tool holder apparatus of the claim 1 wherein, the spindle component includes a top portion of the spindle component rotatable around the bottom portion of the spindle component.

9. The fork lift tool holder apparatus of the claim 1 wherein, the spindle component supports a roll of wrapping material with a weight of six pounds to ten pounds.

10. The fork lift tool holder apparatus of the claim 1 wherein, the electronic device includes a smart phone, electronic tablet, personal digital assistant (PDA), Internet appliance or Internet of Things (IoT), electronic device.

11. The fork lift tool holder apparatus of the claim 1 wherein, the plurality of reenforcing components includes a plurality of raised semi-circular shaped components.

12. The fork lift tool holder apparatus of the claim 1 wherein, the plurality of reenforcing components include a plastic material with fiberglass strands, a plastic material with carbon fiber reinforced nylon filaments, or a composite material with fiber reinforcements.

13. The fork lift tool holder apparatus of the claim 1 wherein, the spindle cut component includes a sharped metal, plastic or composite material edge component for easily cutting a selected portion of the roll of wrapping material at a desired length.

14. The fork lift tool holder apparatus of the claim 1 wherein, the electronic storage component further includes a storage space for labels, a note pad or papers.

15. The fork lift tool holder apparatus of the claim 1 wherein, the fork lift further includes a mini-fork lift, a reach truck fork lift or an order picker forklift.

16. The fork lift tool holder apparatus of the claim 1 wherein, components of the fork lift tool holder apparatus are produced in a plurality of different colors including safety colors of red, yellow or orange.

17. The fork lift tool holder apparatus of the claim 1 further including a Global Positioning System (GPS) component or a Radio Frequency Identifier (RFID) component.

18. The fork lift tool holder apparatus of the claim 1 wherein, components of the fork lift tool holder apparatus are individually manufactured, machined, 3D printed by a 3D printer, extruded, pultruded, or a combination thereof.

19. A fork lift tool holder apparatus, comprising in combination:

a body component including one or more receptacles for receiving one or more connection means to connect the body component to a fork lift, comprising:

an interchangeable, dynamically removable and attachable connection component for connecting the body component to a plurality of different types structural components on a plurality of different types of fork lifts, including one or more receptacles for receiving one or more connection means to connect the dynamically removable and attachable connection component to the plurality of different types of structural components on the plurality of different types of fork lifts;

a cup holder component for receiving a cup or a bottle including a liquid;

a spindle component for engaging a roll of wrapping material, the spindle component including a top portion rotatable around a body portion of the spindle component to allow easier and quicker unwrapping of a portion of the roll of wrapping material;

a spindle guide component for guiding rotation of the roll of wrapping material around the spindle component;

a spindle tear component for tearing off a desired length of the wrapping material from the spindle component;

a plurality of writing utensil components for engaging and storing a plurality of different writing utensils of different sizes;

an electronic storage component for engaging and storing an electronic device; and a plurality of reenforcing components on the body component engaging a bottom portion of the spindle component to strengthen the body component, to prevent bending and flexing of the body component when the roll of wrapping material is placed on and rotated on the spindle component, wherein the plurality of reenforcing components include a plurality of raised semi-circular shaped components of a pre-determined height comprising: a plastic material with fiberglass strands, a plastic material with carbon fiber reinforced nylon filaments, or a composite material with fiber reinforcements.

20. The fork lift tool holder apparatus for claim 19, wherein the interchangeable dynamically removable and attachable connection component include one or more different individual connection components for circular, oval and polygon shaped structural components and structural components with flat surfaces on the plurality of different types of fork lifts.

* * * * *